(No Model.)
E. S. ROBINSON & J. D. MINOR.
HARNESS FOR HORSE BLANKETS.
No. 413,967. Patented Oct. 29, 1889.
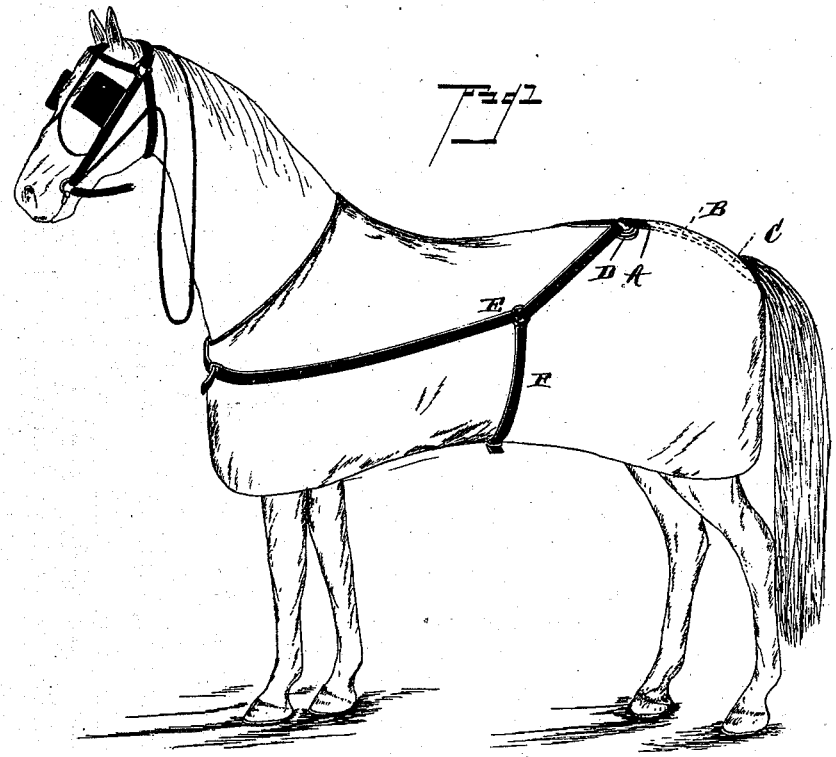
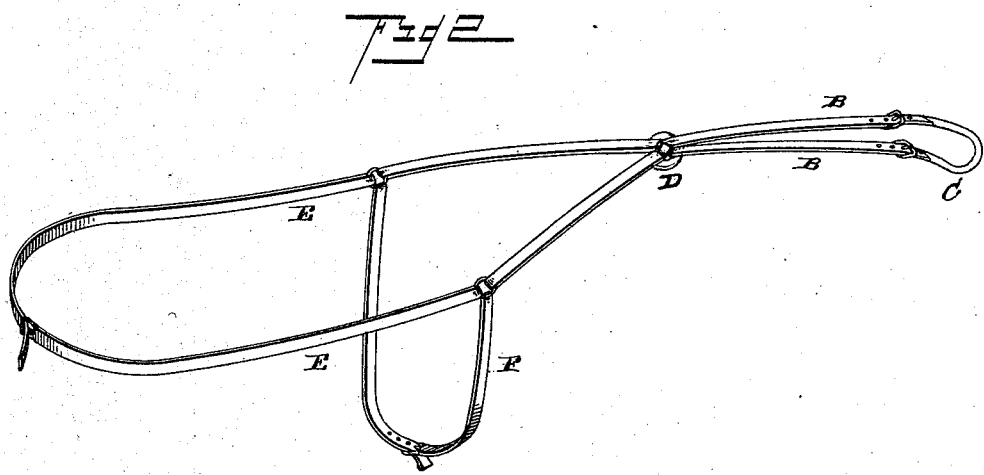
Witnesses
John Imirie
R. W. Bishop.
Inventor
Edgar S. Robinson
And
John D. Minor.
By their Attorneys

UNITED STATES PATENT OFFICE.

EDGAR S. ROBINSON AND JOHN D. MINOR, OF HOBART, NEW YORK.

HARNESS FOR HORSE-BLANKETS.

SPECIFICATION forming part of Letters Patent No. 413,967, dated October 29, 1889.

Application filed April 16, 1889. Serial No. 307,498. (No model.)

*To all whom it may concern:*

Be it known that we, EDGAR S. ROBINSON and JOHN D. MINOR, citizens of the United States, residing at Hobart, in the county of Delaware and State of New York, have invented a new and useful Harness for Horse-Blankets, of which the following is a specification.

Our invention relates to improvements in harness, and has for its object to provide means for holding horse-blankets in position; and it consists in certain novel features hereinafter described and claimed.

In the accompanying drawings, Figure 1 is a perspective view showing the harness in its operative position, and Fig. 2 is a perspective view of the harness removed.

In carrying out our invention we provide the horse-blanket with an opening A at about its center, and straps B B, running through the said opening, are secured to the crupper C, as shown. The front ends of the straps B B are secured to a circular plate or ring D, which is intended to rest on the back of the horse, as shown in Fig. 1. Breast-straps E E are secured at their rear ends to this plate or ring D and extend forward therefrom along the sides of the animal's body and have their front ends buckled together across the breast of the animal. The strap F is made in two sections, which have their upper ends secured each to one of the breast-straps and have their lower ends buckled together below the body of the animal. The surcingle and breast-straps pass over the blanket, as shown in Fig. 1, but, if so desired, they may be passed through loops or rings secured to the blanket, or through openings made in the blanket, but ordinarily it will be found sufficient to pass the several straps over the blanket.

Our improved harness, it will be seen at once, is extremely simple and can be manufactured and sold at a slight cost. It can be quickly and easily placed on the animal, and when fastened will securely hold the blanket in place, so that it will be impossible for the blanket to slip off the horse onto the ground, so as to be trampled upon and torn.

It will be observed that the harness is out of contact with the animal's body, so that it cannot chafe him and make him restless. The harness is light, so as to put no appreciable weight on the horse, and its advantages are thought to be obvious.

Having thus described our invention, what we claim, and desire to secure by Letters Patent, is—

1. A horse-blanket comprising the blanket, the plate D, the straps leading therefrom through the blanket to the crupper, the breast-straps leading from said plate passing over the blanket and secured together across the breast of the animal, and the strap F, secured to the breast-straps and passing over the blanket below said straps, as set forth.

2. A harness for horse-blankets, comprising the plate D, straps leading therefrom to the crupper, the breast-straps E, passing forward from said plate over the blanket and having their front ends secured together, and the strap F, consisting of two sections passing over the blanket and having their upper ends secured to the breast-straps and their lower ends secured together, as set forth.

In testimony that we claim the foregoing as our own we have hereto affixed our signatures in presence of two witnesses.

EDGAR S. ROBINSON.
JOHN D. MINOR.

Witnesses:
CLINTON MCILWAIN,
MORTIMER GRANT.